US005715996A

United States Patent [19]

Cooper et al.

[11] Patent Number: 5,715,996

[45] Date of Patent: Feb. 10, 1998

[54] FUEL INJECTION NOZZLE

[75] Inventors: Richard Lloyd Cooper, Le Roy; James Zizelman, Honeoye Falls; Michael Raymond Salemi; Gary Robert Lippert, both of Rochester; Jeffrey Mark Noll, Honeoye Falls, all of N.Y.

[73] Assignee: General Motors Corporation, Detroit, Mich.

[21] Appl. No.: 573,842

[22] Filed: Dec. 18, 1995

[51] Int. Cl.$^{6}$ .............................. F02M 61/08; F16K 51/00

[52] U.S. Cl. .............................. 239/533.7; 239/533.9; 137/537; 251/284; 251/333

[58] Field of Search .............................. 137/537; 251/333, 251/284, 121; 239/533.1, 533.2, 533.3, 533.7, 533.9, 533.12, 584

[56] References Cited

U.S. PATENT DOCUMENTS

| | | | |
|---|---|---|---|
| 1,001,510 | 8/1911 | Curbey | 251/284 X |
| 1,544,219 | 6/1925 | Collar | 251/284 X |
| 2,520,092 | 8/1950 | Fredrickson et al. | 251/284 X |
| 4,408,772 | 10/1983 | Frelund | 239/533.12 X |
| 5,070,845 | 12/1991 | Avdenko et al. | 123/470 |
| 5,392,994 | 2/1995 | Zizelman et al. | 239/533.9 |

FOREIGN PATENT DOCUMENTS

| | | | |
|---|---|---|---|
| 564909 | 10/1944 | United Kingdom | 239/533.7 |

*Primary Examiner*—Andres Kashnikow
*Assistant Examiner*—Robin O. Evans
*Attorney, Agent, or Firm*—Karl F. Barr, Jr.

[57] ABSTRACT

A fuel injection system is disclosed having a fuel injection nozzle which receives pressurized fuel pulses from a source. The nozzle includes a body having a tubular nozzle body with a longitudinally extending opening extending therethrough. A valve seat is located between the upstream and downstream ends of the longitudinal opening in the valve body for engagement with a valve member to thereby regulate the flow of fuel through the opening. A downstream stop member includes a hollow cylinder with a diametrical member extending across one end. The cylindrical stop member is received over the downstream end of the nozzle body with the diametrically extending member disposed across the downstream end of the longitudinal opening to thereby limit the outward range of movement of the valve member from the opening. As a result, the valve member and the downstream end of the longitudinally extending opening define an annular fuel metering orifice therebetween to regulate the flow of fuel from the nozzle.

3 Claims, 4 Drawing Sheets

FUEL INJECTION NOZZLE

TECHNICAL FIELD

The invention is directed to a nozzle for discharging fuel to the intake system of an internal combustion engine.

BACKGROUND

In the fuel injection system set forth in U.S. Pat. No. 5,070,845 issued to Avdenko et al., a fuel system is disclosed having an injector for metering fuel to a plurality of fuel nozzles. Fuel is distributed through individual fuel lines and is discharged via the nozzles at locations adjacent the engine intake ports. The nozzle disclosed in Avdenko et al., has a body with a tubular seat member having a valve seat with an opening for the discharge of fuel therethrough. A poppet valve member is operable, relative to the valve seat, to interrupt fuel flow through the opening and an extension spring anchored to the nozzle body and to the valve member urges the valve into a normally closed, seated position against the valve seat.

In operation, the valve member is moved from its closed, seated position on the valve seat when a minimum required opening pressure is achieved on its upstream side. Fuel flow through the nozzle is initiated upon movement of the valve member off of its associated valve seat. In its open position, the poppet valve member does not operate as a fixed orifice and, therefore, cannot provide a flow metering function. The extent of valve movement depends upon the fuel pressure resulting in fuel flow sensitivity through the nozzle.

SUMMARY OF THE INVENTION

The invention provides an improved nozzle suitable for use in a fuel injection system in which pressurized fuel is metered to a nozzle. According to the present invention a fuel injection nozzle includes a body adapted to receive fuel, having a valve seat with an opening for discharging fuel. Disposed within the body is a poppet valve assembly including a valve member engageable with the valve seat to interrupt the flow of fuel through the opening. A spring anchors the valve assembly to the tubular body and biases the valve member into engagement with the valve seat.

The improved fuel injection nozzle of the present invention may include, as a feature, a downstream stop assembly applied over the outside diameter of the nozzle body adjacent the valve seat opening. The stop assembly is operable to limit travel of the poppet valve assembly to a determined axial travel. Once in contact with the poppet stop, the valve ceases to act as a fuel regulator and begins to function, in concert with the valve seat, as a fixed metering restriction. The downstream stop is constructed in a basket-like configuration with a single web contacting the downstream side of the ball to minimize fuel accumulation and disruption.

The improved fuel injection nozzle provided by the invention may include, as a further feature, a valve seat that is modified to include a wide angle, seating portion and a very narrow angle, performance portion. The poppet valve seats, to close off fuel flow through the opening, against the wide angle, seating portion of the modified valve seat. As the poppet valve moves off of the valve seat to initiate fuel flow through the opening, the poppet valve ball moves axially into the narrow angle portion of the modified valve seat establishing a minimal radial clearance around the ball. The small clearance creates a restriction to fuel flow around the ball, thereby placing a significant force on the ball to drive it against the downstream web of the poppet stop. Fuel metering is established between the ball and the downstream edge of the narrow angle, performance portion.

These and other features, objects and advantages of this invention will be more apparent from the following detailed description and drawings.

DESCRIPTION OF THE PREFERRED EMBODIMENT

Figure 1:
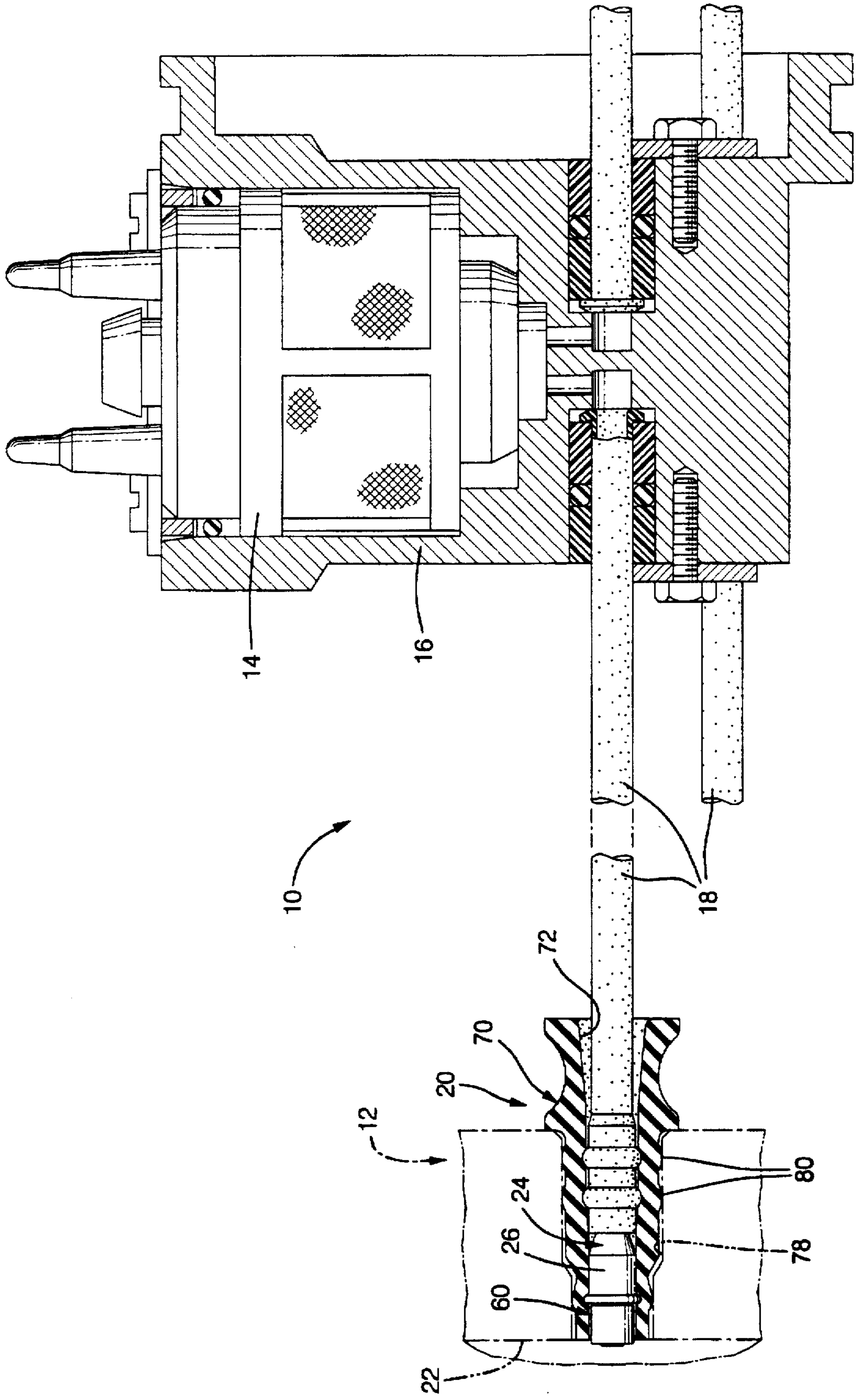
FIG. 1 shows a fuel injection system that meters fuel through a fuel line to a nozzle employing features of the present invention.

Referring to the drawings, FIG. 1 illustrates a fuel injection system, designated generally as 10, for delivery of fuel to an internal combustion engine 12. An injector 14 is mounted in a fuel meter body 16 and is supplied fuel at a desired pressure. Injector 14 meters the fuel, in the form of pressurized pulses, to individual fuel injection lines 18. Each line terminates at a fuel injection nozzle 20 that operates to discharge the metered fuel into the air stream flowing through individual engine inlet ports 22 of the engine 12.

Figure 2:
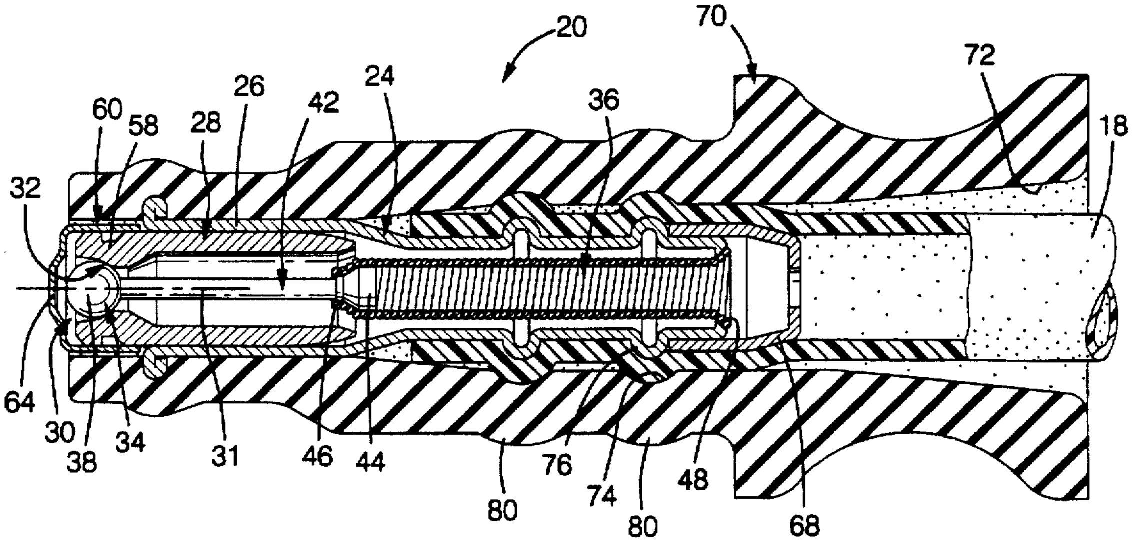
FIG. 2 is an enlarged, sectional view of a portion of the FIG. 1 nozzle removed from the engine and the fuel meter body, showing details of its construction.
Figure 3:
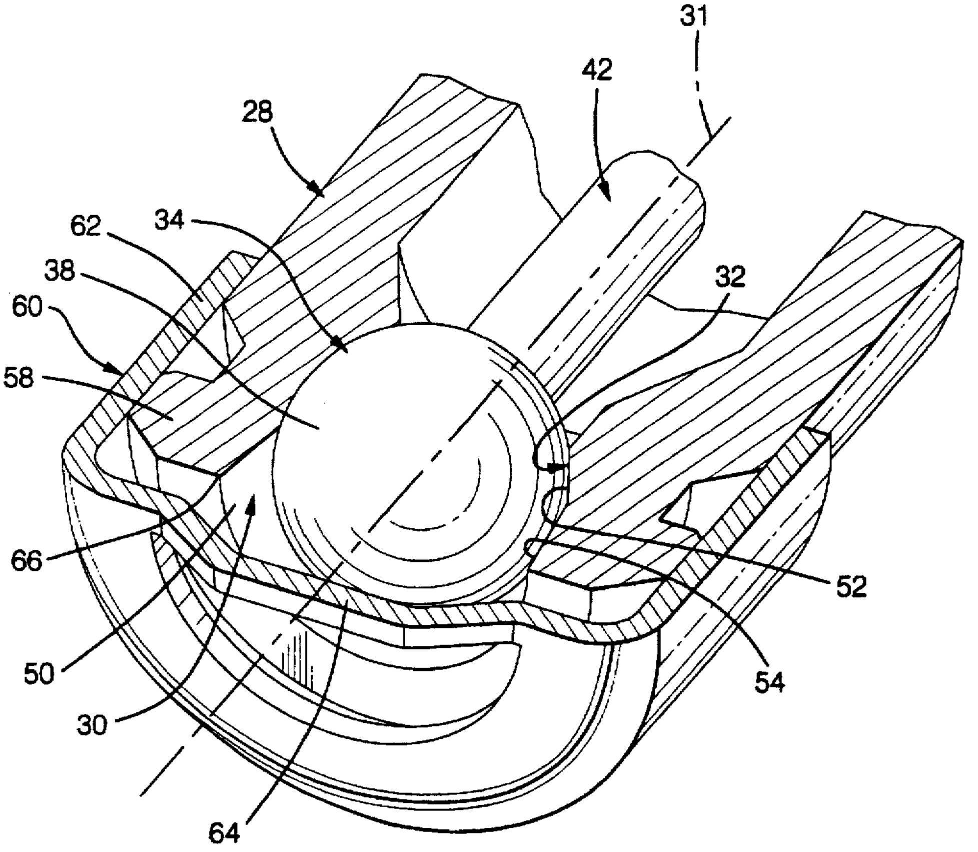
FIG. 3 is an enlarged, sectional, isometric view of a portion of the FIG. 2 nozzle showing additional details of its construction.

As shown in FIGS. 2 and 3, fuel injection nozzle 20 has a tubular nozzle body 24 adapted to receive pulsed, pressurized fuel from an associated fuel injection line 18. The downstream end of the body 24 has an enlarged diameter, bell-shaped portion 26 configured to receive a tubular seat member 28. The nozzle 20 has a longitudinally extending fuel passage 30, defined by axis 31, for discharging fuel and an annular valve seat 32 surrounding passage 30. A poppet valve member 34 is engageable with the valve seat 32 to interrupt fuel flow through the passage 30, and a helically coiled extension spring 36 is anchored to body 24 and to the valve member 34 and biases the valve member 34 to engage the valve seat 32. When the pressure differential across valve element 38 of valve member 34 reaches a desired level, the valve member is displaced from valve seat 32 to thereby initiate the flow of fuel through the nozzle body fuel passage 30 for discharge from the nozzle 20 to the engine inlet port 22.

Valve member 34 includes the valve element or ball 38 which is welded to pin 42. The head 44 of pin 42 is surrounded by a section of reduced coils 46 at a first end of the extension spring 36 to thereby anchor the extension spring 36 to the valve member 34. The second end 48 of extension spring 36 engages tubular body 24 thereby anchoring the spring to the body.

Figure 4A:
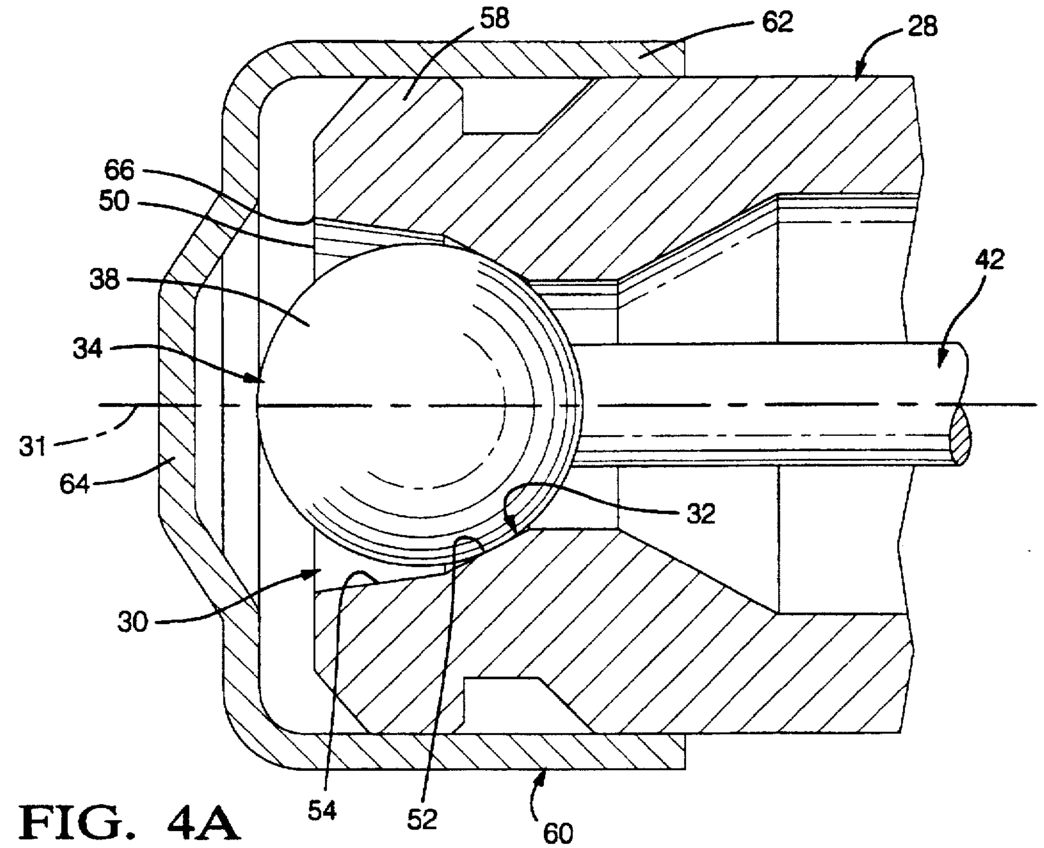
FIGS. 4A, 4B and 4C are enlarged partial sectional views of the nozzle of FIG. 2, illustrating various modes of operation.
Figure 4B:
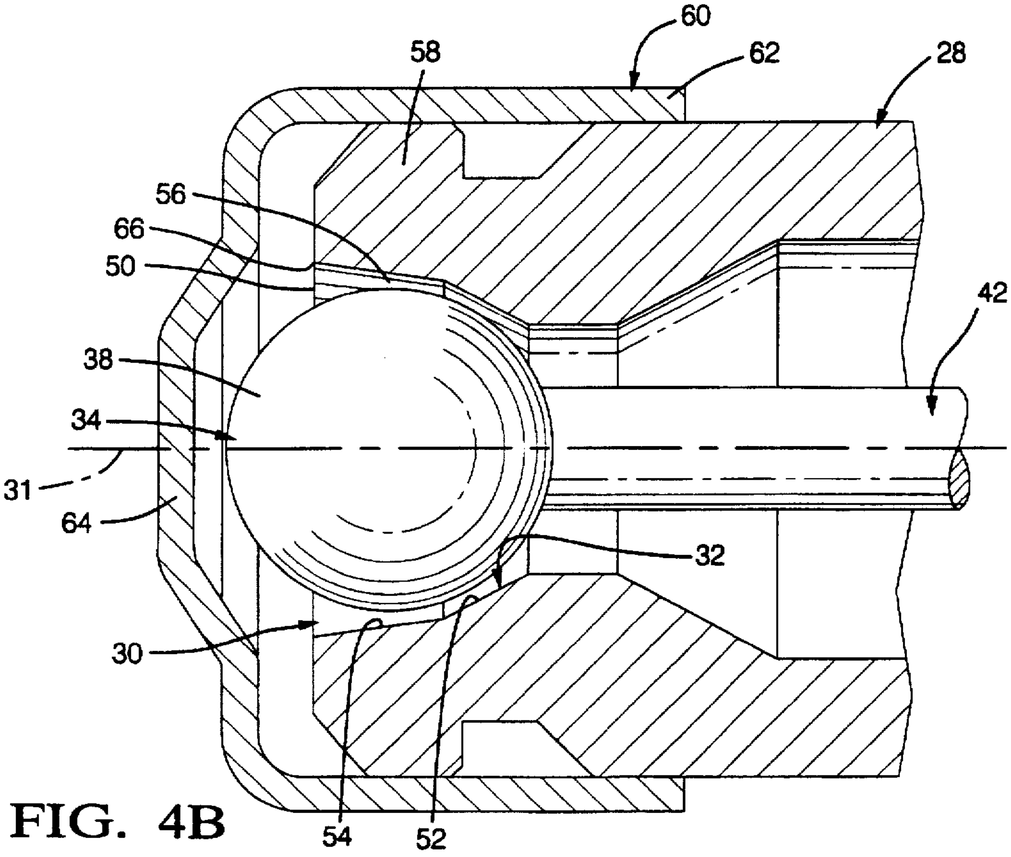
Figure 4C:
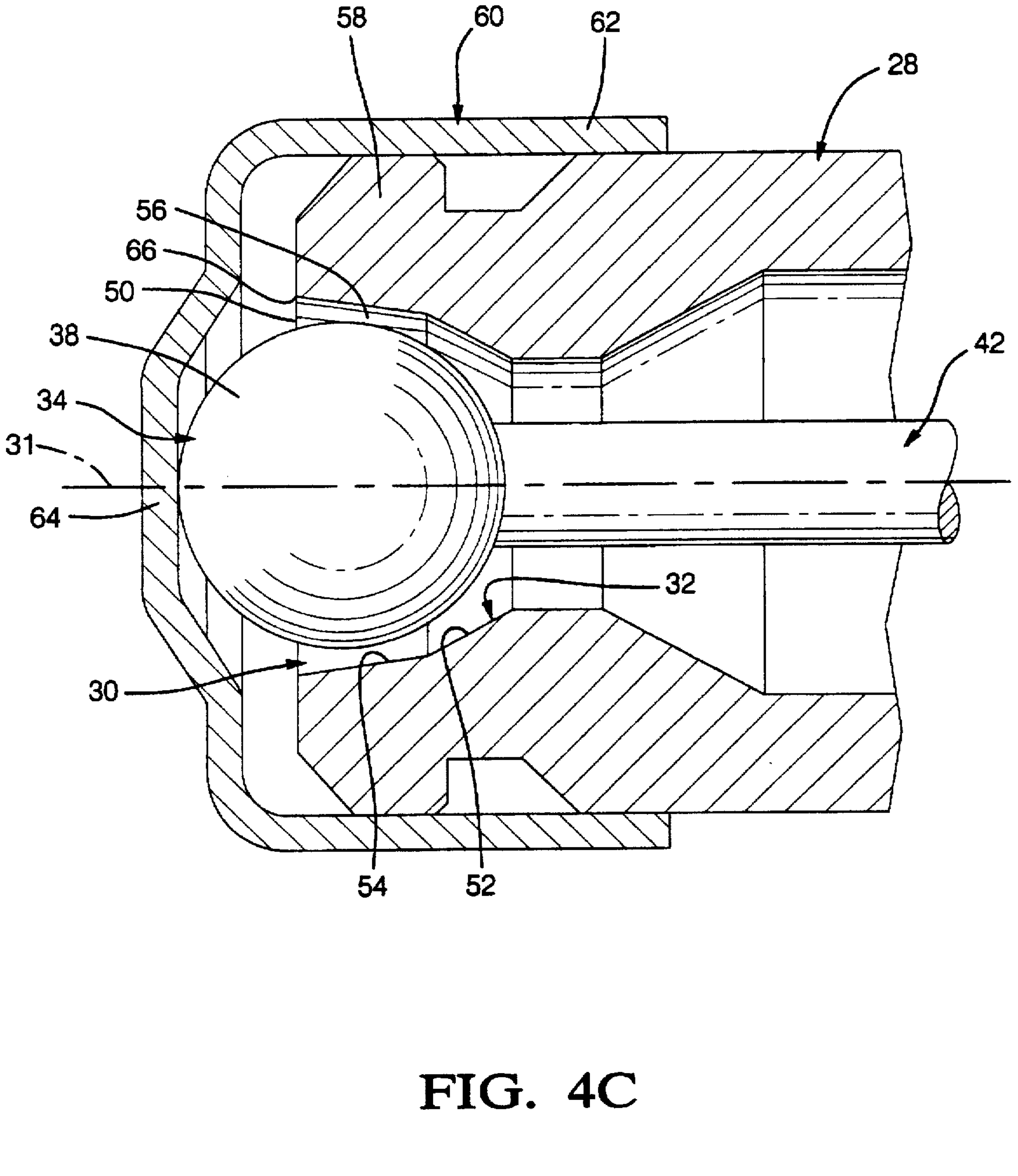

Seat member 28 of nozzle 20 is axially movable relative to the nozzle body 24, allowing adjustment of the length of spring 36 and thus the bias exerted by the spring on valve member 34. This adjustment allows calibration of the pressure differential across the valve element 38 required to initiate movement of the valve off of the seat 32. The annular valve seat 32 which, together with the valve element 38, serves as the sealing mechanism in fuel injection nozzle 20.

is situated axially inwardly of the downstream end 50 of fuel passage 30. The valve seat 32 is configured with a wide angle seating surface 52, on the order of 35–90 degrees in order to facilitate opening of the valve member 34, see FIG. 4A. Disposed between the wide angle valve seating surface 52 of valve seat 32 and the downstream end 50 of passage 30 is a narrow angle, conical section or passage 54 on the order of 1–15 degrees. As differential pressure across the valve element 38 reaches a desired level, the valve member 34 is displaced from the wide angle seating surface 52 of valve seat 32 to thereby initiate the flow of fuel through the nozzle body fuel passage 30 for discharge from the nozzle 20 to the engine inlet port 22. As valve movement and resulting fuel flow is initiated, the valve element 38 moves axially into the narrow angle, conical section 54 of the seat member 28, FIG. 4B, where an annular clearance 56 is defined between the valve element 38 and the wall 54 of the passage 30. The clearance dimension establishes a restriction to fuel flow around the ball 38 thereby creating a significant drag force which is effective to drive the valve 34 axially towards an open position shown in FIG. 4C.

Received over the downstream end 58 of the tubular seat member 28, adjacent the outlet 50 of fuel passage 30, is a stop member 60. The stop member 60 includes a cylindrical sleeve 62 which slides over the outer periphery of the seat member 28 and a diametrically extending stop 64 which extends across the downstream end of the cylindrical member 62 and operates to define the outward, axial range of travel of the valve element 38 when the element moves outwardly under the urging of a fuel pulse delivered by injector 14. The stop 64 is preferably limited to a single, thin member so as to minimize interference with fuel departure from the nozzle tip. The stop member 60 is axially adjustable during assembly and calibration to allow for adjustment of axial valve member travel.

When the valve element 38 is driven against the stop 64 under the force of the fuel flow through the annular opening 56, the poppet ceases to operate as a fuel pressure regulator and functions as a fixed metering orifice. The fixed metering orifice function is defined by the perimeter of valve element 38 and the downstream edge 66 of the narrow angle, conical section 54 of the seat 32.

With the valve element 38 urged against the stop 64 the sensitivity to variations in supply fuel pressure are significantly reduced. The reduction in sensitivity has a direct relation to fueling accuracy which is an important attribute of fuel system performance due to its direct impact on vehicle emission levels. Additionally, the supply pressure for the fuel system may be subject to significant reduction thereby limiting the load placed on the fuel pump resulting in lower cost, noise and increased durability.

The tendency for an unrestrained poppet nozzle to over-respond to an input pressure is eliminated by the direct, limiting contact between the valve element 38 and the stop 64. Elimination of over-response provides an improved linear response by improving accuracy of fuel delivery during the valve opening event. Additionally, the application of the stop member 60 to the fuel injection nozzle 20 eliminates valve resonance which may be prevalent systems with unrestrained valves which are subject to movement caused by instability in supply fuel pressure.

Spray consistency is assured by the application of the downstream stop member 60. Such consistency is realized since the stop 64 fixes the location of the poppet ball valve 38 relative to the outlet 50 of the fuel passage 30 thereby eliminating fuel spray variation from pulse to pulse.

The fuel distribution line 18 of the fuel system 10 is slipped over the upstream end 68 of the nozzle body 24. Fuel injection nozzle 20 also may include a molded rubber mounting bushing 70 with a central bore 72 that embraces the fuel line 18. Within the bore 72, an annular groove 74 receives a peripheral locating flange 76 formed on the body 24 to retain the body within the bushing 70.

Bushing 70 is mounted in an opening 78 in the wall of inlet port 22 and may include a series of peripheral beads 80 which operate to engage the wall 78 to retain and seal bushing 70 within the opening.

The foregoing description of the invention has been presented for the purpose of illustration and description. It is not intended to be exhaustive, nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various modifications as are suited to the particular use contemplated. Therefore the foregoing description is to be considered exemplary, rather than limiting, and the true scope of the invention is that described in the following claims.

We claim:

1. A fuel injection nozzle adapted to receive pressurized fuel pulses from a source comprising a nozzle body having a fuel passage extending longitudinally from a first, upstream end to a second, downstream end, an annular valve seat surrounding said fuel passage adjacent said second, downstream end, a valve member, movable between opened and closed positions relative to said valve seat to establish fuel flow through said passage, and a valve stop member including a cylindrical body having a first, upstream end and a second downstream end, said upstream end slidingly received about said downstream end of said nozzle body, said cylindrical body including a diametrically extending stop extending across the downstream end of said cylindrical body, downstream of said valve member, to define, relative to said valve seat, an axial range of travel for said valve member within said fuel passage.

2. A fuel injection nozzle, as defined in claim 1, said valve member and said downstream end of said fuel passage defining a fuel metering orifice therebetween when said valve member moves off of said valve seat, under the influence of a fuel pulse from said source, to thereby engage said diametrically extending stop.

3. A fuel injection nozzle adapted to receive pressurized fuel pulses from a source comprising a nozzle body having a fuel passage extending longitudinally from a first, upstream end to a second, downstream end, an annular valve seat surrounding said fuel passage adjacent said second, downstream end, a valve member, movable between opened and closed positions relative to said valve seat to establish fuel flow through said passage and a downstream stop member including a hollow cylinder having a first, upstream end, a second, downstream end and a diametrically extending member extending across said second, downstream end, said first end of said hollow cylinder circumjacently disposed about said second, downstream end of said nozzle body with said diametrically extending member disposed in a downstream relationship to said valve member to thereby limit the downstream range of movement of said valve member relative to said valve seat, said valve member and said downstream end of said longitudinally extending passage defining a fuel metering orifice therebetween when said valve member engages said diametrically extending member.

* * * * *